Nov. 7, 1933.   O. WITTEL   1,933,784
FOLDING FINDER FOR CAMERAS
Filed Feb. 13, 1932
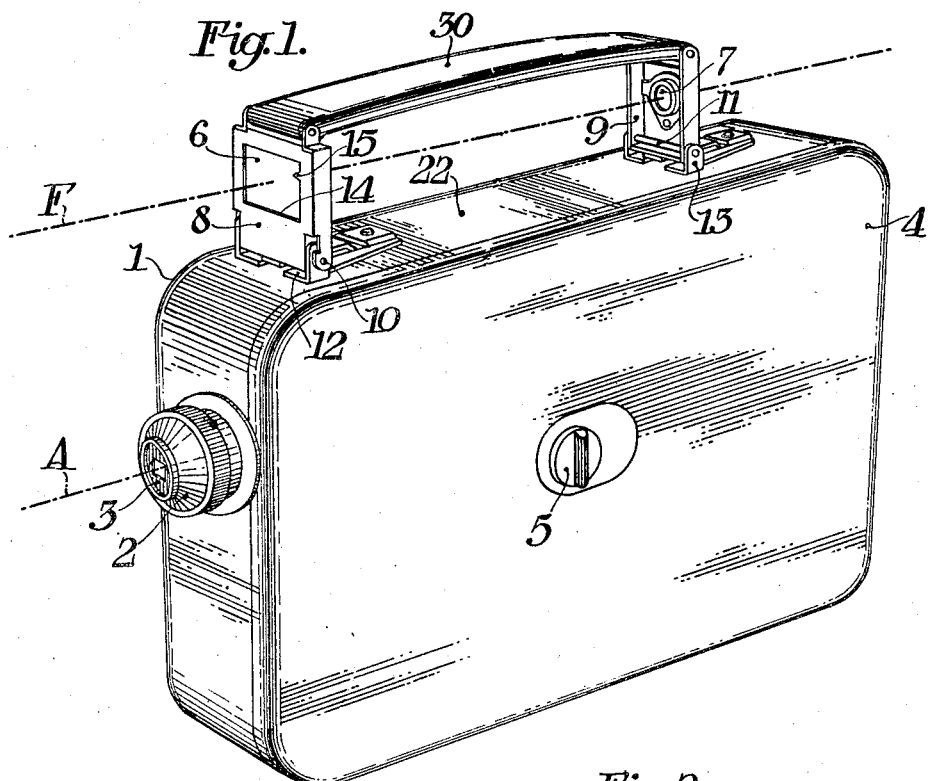
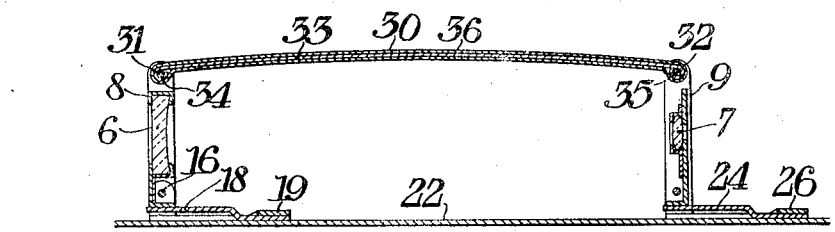
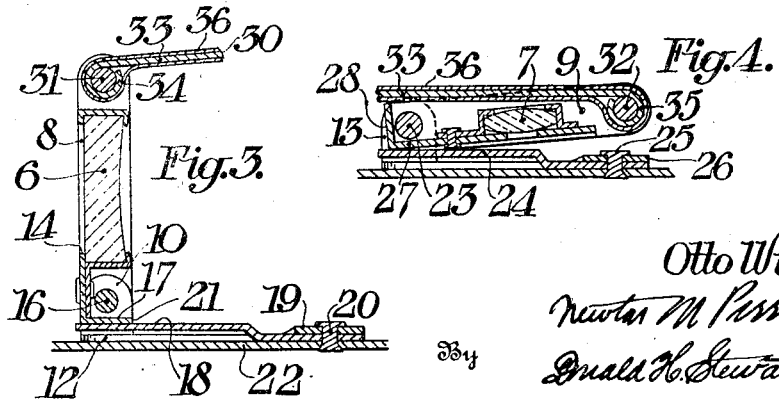
Inventor:
Otto Wittel,
Newton M. Purvis
Donald H. Stewart,
By
Attorneys Patented Nov. 7, 1933

1,933,784

UNITED STATES PATENT OFFICE 1,933,784

FOLDING FINDER FOR CAMERAS

Otto Wittel, Rochester, N. Y., assignor to Eastman Kodak Company, Rochester, N. Y., a corporation of New York Application February 13, 1932. Serial No. 592,738

8 Claims. (Cl. 33—64)

This invention relates to photography and more particularly to finders for photographic cameras. One object of my invention is to provide a finder consisting of two separated parts mounted on a camera body, the parts being connected to move together. Another object of my invention is to provide a handle connecting the two finder parts by which the parts may be swung to and from an operative position. Another object of my invention is to provide two finder brackets for supporting the finder elements, each bracket being hinged to the camera and adapted to be latched in either an operative position in which the finder elements may define the field of view or in an inoperative position in which the finder elements are folded close to the camera. Still another object of my invention is to provide a relatively stiff handle connecting the two finder brackets in such a way that the handle will not obscure the field of view, and other objects will appear from the following specification, the novel features being particularly pointed out in the claims at the end thereof.

Coming now to the drawing wherein like reference characteristics denote like parts throughout:

Figure 1 is a perspective view of a camera equipped with a finder constructed in accordance with and embodying a preferred form of my invention.

Figure 2 is a fragmentary section taken longitudinally through the finder shown in Figure 1.

Figure 3 is an enlarged fragmentary detail in section showing the front finder element and finder bracket supporting the element, and Figure 4 is an enlarged fragmentary detail in section showing the rear finder element and bracket folded into an inoperative position.

This application is a continuation in part of my copending application, Serial No. 510,088, filed January 21, 1931.

While it is obvious that a finder constructed in accordance with my invention is suitable for any photographic camera, it is particularly suitable for a motion picture camera of compact design and, in Figure 1 I have shown my invention as applied to such a camera.

The camera body 1 may be of the usual type, having an objective mount 2 on the front with an opening 3 through which light rays pass to as objective which forms a mast of a predetermined view on the film in the usual manner. The axis of the main objective is shown at A. The camera may be equipped with the usual removable door 4 which may be latched by any suitable latching means 5 to hold the cover in place.

In accordance with my invention, I provide a finder which preferably consists of a front element 6 and a rear element 7 mounted in brackets 8 and 9 which are hinged at 10 and 11 to suitable supports 12 and 13. The finder elements 6 and 7, as indicated in the last three figures, may comprise a negative or collecting lens 6 in a mask 14 of the proper proportions to design the field of view. The finder axis F may be arranged substantially parallel to the axis A of the objective and if desired a pointer 15 may be provided in the mask 14 to indicate the top of a picture when a nearby object is being photographed.

Referring particularly to Figure 3, the front finder element 6 is adapted to move about a hinge 10, the pintle 16 of which extends between the supporting members 12. The lower edge of the front finder bracket is provided with a flat surface 17 adapted to engage the end 18 of a leaf-spring which is pressed beneath a crossed strap 19 on the support 12 and is riveted at 20 so as to form a resilient latching member which will tend to hold the bracket 8 in either the operative position shown or by contacting with the flat edge 21 will tend to hold the front finder bracket folded flat against the top 22 of the camera.

As indicated in Figure 4, the rear element 7 may consist of a positive lens of suitable power to magnify the image formed on the collective lens 6, lens 7 is carried by a bracket 9 hinged to a support 13 by a pintle 23 in a similar manner to the front finder bracket.

Like the front finder bracket, there is a leaf-spring 24 riveted at 25 to a rear strap 26 of the support 13, this spring serving to contact with the wall 27 of the finder bracket to hold the bracket either in the inoperative position shown in Figure 4, or by contacting with the flat surface 28 of the bracket to hold it in the erect operative position indicated in Figure 2.

In order to move both of these brackets 8 and 9 simultaneously, I provide a handle 30 which, as best shown in Figure 2, is connected to the hinged pintles 31 and 32 carried by the brackets 8 and 9.

I prefer to make this handle of some rather stiff, more or less springy material so that when the handle is not in use for carrying the camera, there is no tendency for the handle to sag downwardly and obscure any part of the field of view. A preferred form of handle consists of a thin spring plate 33, the ends of which 34 and 35 may be looped about the hinged pintles 31 and 32. A decorative covering 36 may be applied to the outside of the metal strap if desired.

The operation of this device is extremely simple. When carrying the camera 1 by the handle 30, the finder brackets 8 and 9 serve as links to support the camera and the handle is conveniently held spaced from the top wall 22 of the camera. In this position, the finder brackets 8 and 9 are held erect in an operative position by the leaf-springs 18 and 24 and the finder is in position for use. For distant objects, the collective lens 6 accurately defines the field of view. For nearby objects, allowances should be made to overcome parallax. For instance, it is usually sufficient to provide a pointer, such as 15, to indicate the top of a picture for nearby views, such as portraits or five or six feet from the camera.

When the camera is packed away or is to be placed in a carrying case, the handle 30 can be moved rearwardly and downwardly so as to fold both finder brackets 8 and 9 compactly against the camera top 22 in which position the leaf-springs 18 and 24 will hold the parts in the folded position.

The finder brackets therefore serve the two-fold purpose of supporting the handle and supporting the finder elements, and the handle is used not only to move the finder elements to and from an operative finding position but also to carry the camera.

What I claim as my invention and desire to be secured by Letters Patent of the United States is:

1. In a finder for cameras, the combination with a camera body, of a pair of hinged finder brackets movably mounted on said camera body, and means for simultaneously moving said brackets carried solely by said brackets comprising a handle also adapted to carry the camera.

2. In a finder for cameras, the combination with a camera body, of a pair of hinged finder brackets movably mounted on said camera body, and means for simultaneously moving said brackets comprising a handle said handle also being adapted to carry said camera, each end of said handle being movably mounted on a finder bracket.

3. In a finder for cameras, the combination with a camera body, of a pair of hinged finder brackets movably mounted on said camera body, each finder bracket carrying a hinge pintle on that part of the bracket which is opposite to the hinged connection with the camera body, and a handle connected to the hinge pintles said handle also being adapted to carry said camera.

4. In a finder for cameras, the combination with a camera body, of a pair of hinged finder brackets movably mounted on said camera body, each finder bracket carrying a hinge pintle on that part of the bracket which is opposite to the hinged connection with the camera body, and a handle connected to the hinge pintles, said handle including a relatively stiff part preventing sagging between the two hinge pintles.

5. In a finder for cameras, the combination with a camera body, of a pair of hinged finder brackets movably mounted on said camera body, each finder bracket carrying a hinge pintle on that part of the bracket which is opposite to the hinged connection with the camera body, and a handle connected to the hinge pintles, said handle including a relatively stiff spring metal member connecting said hinge pintles and normally adapted to curve upwardly between said pintles.

6. A finder for cameras comprising front and rear finding elements, a hinged connection between each element and a camera body, means tending to hold said hinged elements in one position, and a handle connected to each element whereby said elements may be simultaneously operated.

7. A finder for cameras comprising front and rear finding elements, a hinged connection between each element and a camera body, means tending to hold said hinged elements in predetermined positions including springs engaging flat parts on said elements, and a handle connecting said elements for moving them between said predetermined positions.

8. In a finder for cameras, the combination with a camera body, of a pair of finder brackets hinged to the camera body, said brackets having angularly disposed flats adjacent said hinged connections, leaf springs adapted to press on said angularly disposed flats tending to hold said brackets in operative or inoperative positions, and a handle connecting said brackets for simultaneously moving said brackets and carrying the camera.

OTTO WITTEL.